Nov. 9, 1943.                E. C. RANEY                2,333,818
                            HEATING SYSTEM
                        Filed May 29, 1940            2 Sheets-Sheet 1

INVENTOR
Estel C. Raney
BY
Warren W.F. Schmieding
ATTORNEY

Nov. 9, 1943.　　　　　E. C. RANEY　　　　　2,333,818
HEATING SYSTEM
Filed May 29, 1940　　　　2 Sheets-Sheet 2

INVENTOR
Estel C. Raney
BY
Warren H. F. Schmieding
ATTORNEY

Patented Nov. 9, 1943

2,333,818

UNITED STATES PATENT OFFICE 2,333,818

HEATING SYSTEM

Estel C. Raney, Columbus, Ohio, assignor to Ranco Incorporated, Columbus, Ohio, a corporation of Ohio Application May 29, 1940, Serial No. 337,851

1 Claim. (Cl. 98—2)

The present invention relates to heating systems for the occupant compartments of vehicles, such as automobiles, and more particularly to heating systems for sedans.

One of the objects of the present invention is to provide a heating system in which outside air, after being heated, is expelled into the occupant compartment of a vehicle at a plurality of remote sections of the compartment and to provide for forcing the air into the compartment under pressure which is created by the forward movement of the vehicle or by a blower when the vehicle is stationary, or moving at a slow speed.

More specifically, it is another object of the present invention to provide a duct system for delivering heated air from a heater to a plurality of different sections of the vehicle, for example to the front and rear sections of the vehicle and to the windshield.

A still further object of the invention is to provide a duct system including a fan or blower wherein the air may flow freely therethrough although the fan is not actuated by its motor.

In carrying out the foregoing objects, it is a further object of the invention to provide the housing of a sirocco type fan or blower with a plurality of outlets and a vane or vanes for directing the air.

Other and further objects and advantages will be apparent from the following description, reference being had to the accompanying drawings wherein a preferred form of embodiment of the present invention is clearly shown.

Figure 1:
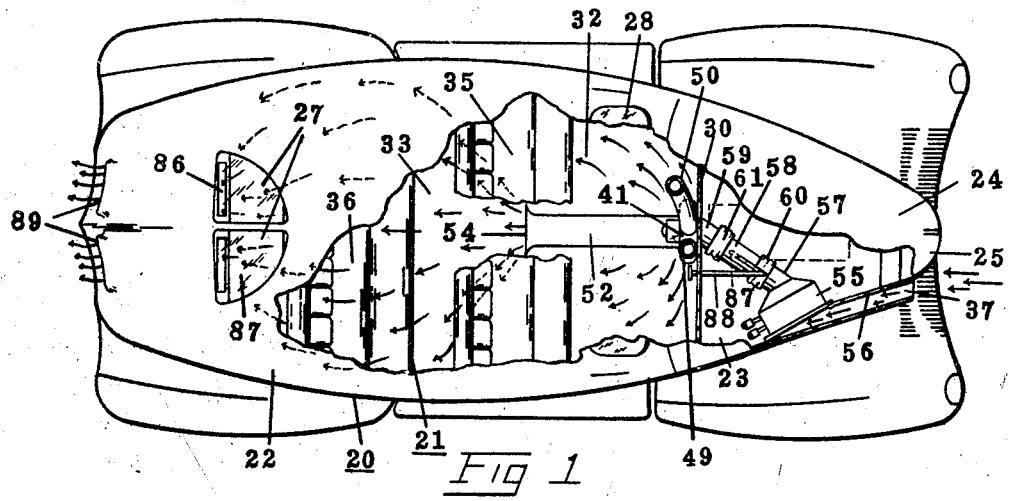
Fig. 1 is a top plan view of a sedan type automobile, parts thereof being broken away and shown in section to show parts of the heating system.

Referring to the drawings, the vehicle which I have chosen to illustrate one form of my invention is an automobile of the sedan type and is generally shown at 20 and includes an occupant compartment 21 formed by the body 22 and the engine compartment 23 formed by the housing 24 including a hinged hood 25. The body 22 includes the usual side doors 26, rear windows 27, windshield 28, instrument panel 29 and the dash board 30. The compartment 21 may be said to be divided into two sections 32 and 33 by the front seat 35. The rear seat is shown at 36.

Figure 6:
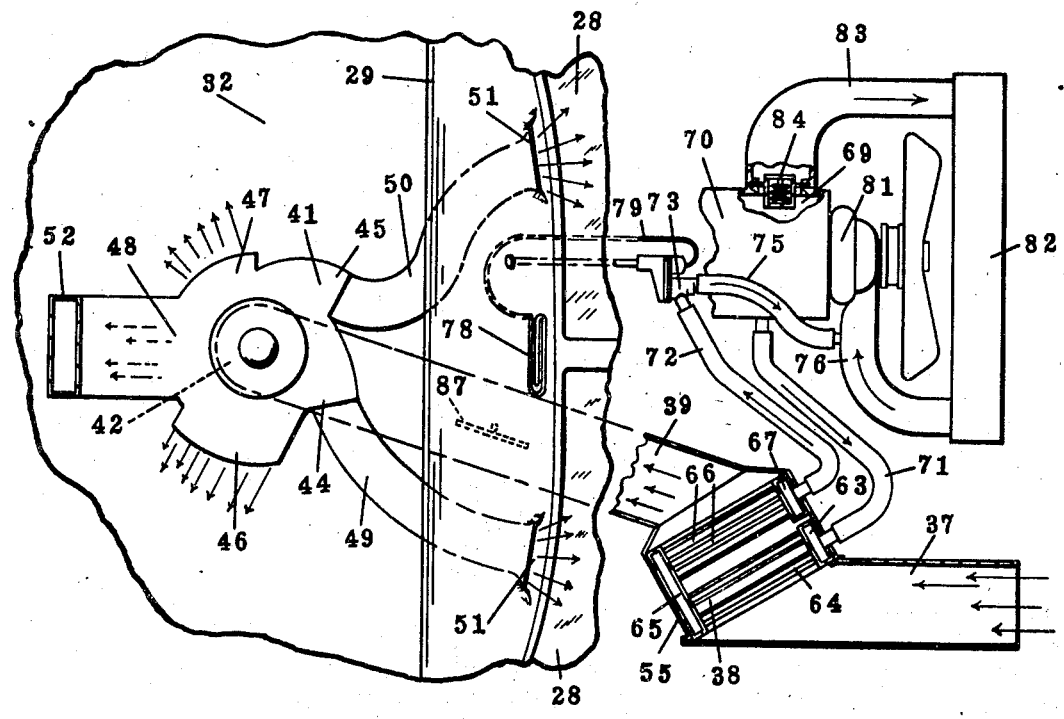

The heating system for the occupant's compartment is best shown in the schematic view, Fig. 6, wherein the air to be heated is conducted through the duct 37 through a heater 38 and by a duct 39 to a manifold 41. This manifold is provided with an inlet 42 and five outlets 44, 45, 46, 47 and 48. Outlets 44 and 45 are connected, respectively, with ducts 49 and 50 which latter extend upwardly and have their outlets 51 extending through the instrument panel 29 and are disposed adjacent the lower part of the right and left sides of the windshield. Outlets 46 and 47 discharge directly into the right and left side of the front part of the front section 32. Outlet 48 is connected with a duct 52 which extends downwardly to the floor 53 and then rearwardly along the floor and under the front seat 35. Preferably the duct 52 stops short of the rear seat so that the air discharged from the outlet 54 thereof is diffused and expelled throughout a wide area to the rear of the front seat.

Figure 2:
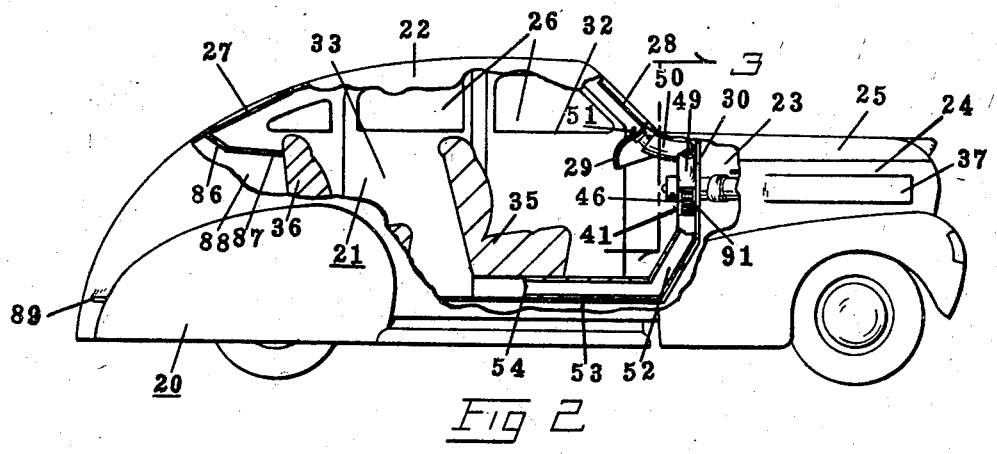
Fig. 2 is a side view of an automobile with parts thereof broken away and shown in section.
Figure 3:
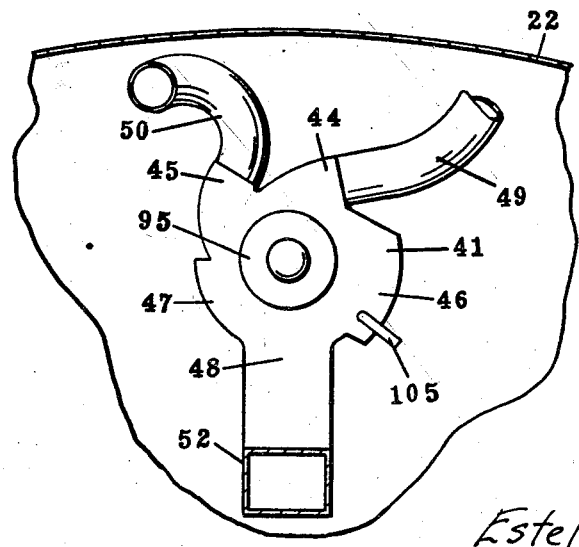
Fig. 3 is a fragmentary view, partly in section, the section being taken on line 3—3 of Fig. 2, showing the blower and part of the duct system.
Figure 4:
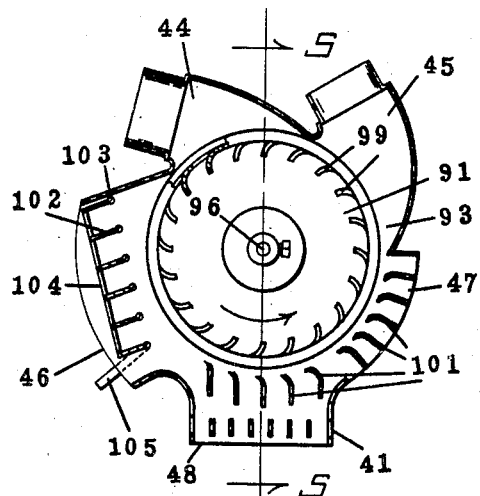
Fig. 4 is a sectional view of the blower looking towards the rear of the automobile.
Figure 5:
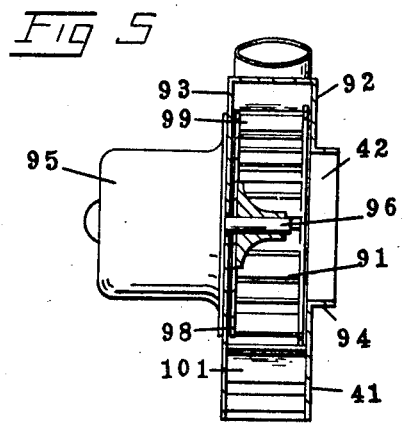
Fig. 5 is a sectional view of the blower, the section being taken on line 5—5 of Fig. 4, and, Fig. 6 is a schematic view of the heating system.

More specifically, the duct 37, which provides an inlet to the heater 38, is formed by flaring the housing slightly as shown in Figs. 1 and 2 and by a wall 56 which is secured at the top and bottom thereof to the inside of the wall of the housing 24 and over the open side of the flared portion. A shroud 55 for the heater 38 may be suitably mounted either on the engine or the side of the engine housing 24 and this shroud is reduced in size and merges into a pipe 57 which is connected by pipes 58 and 59 and flexible couplings 60 and 61 to the inlet 42 of the manifold 41. The heater 38 comprises an inlet header 63 which is connected by pipes 64 to an interconnecting header 65 which in turn is connected by pipes 66 with an outlet header 67. The pipes are spaced from one another for the passage of air through the heater. Hot liquid is delivered from the cooling jacket 69 of the engine 70 to the inlet header 63 by a flexible tube 71. The liquid after passing through the heater and out of the outlet header 67 is conducted by a flexible tube 72 to the inlet side of a control valve 73. The liquid after passing the control valve 73 flows through a tube 75 to the pipe 76. Preferably the valve 73 is of the thermally controlled type, such as that shown in the co-pending application of W. V. Hobbs et al., Serial Number 267,719, filed April 13, 1939, and the quantity of liquid flowing therethrough is increased and decreased with respect to decrease and increase, respectively, of the temperature of the air in compartment 21. For this purpose there is provided a thermal responsive element 78 which is connected by a tube 79 with the control mechanism in the valve 73. The liquid is forced through the heater under pressure by a water pump 81. This water pump withdraws the liquid from the radiator 82 through the pipe 76 and discharges the water into the cooling jacket 69. The heated liquid flows from the cooling jacket 69 by a pipe 83 to the radiator 82. A thermostatically controlled valve 84 of any well known type controls the flow of liquid from the jacket 69 to the radiator 82. This valve 84 is responsive to the temperature of the liquid and permits increased and causes decreased flow of liquid to the radiator in response to increase and decrease of liquid temperature.

As the automobile moves forwardly, air will be forced through the duct 37, heater 38, duct 39 and manifold 41, whence the air will be expelled under pressure through the outlets 51 of the ducts 49 and 50, through the outlets 46 and 47 and through the outlet 54 of duct 52. The outlets of the manifold 41 are proportioned so that the desired amount of air can pass through each, whereby the temperature, at head level of the occupants, will be substantially the same throughout the entire compartment 21. Manifestly since air is forced into the compartment 21 under pressure, the air in compartment 21 will be slightly higher in pressure than the outside air. Consequently there will be no air leaking in around the windows and doors, and in this manner cold drafts are eliminated. The air from the compartment 21 will leak through the cracks around the windows and doors and in this manner fresh air is continually flowing through the compartment 21 and all moisture, caused by respiration of the occupants of the compartment, will be removed continuously with the effect that the air is maintained relatively dry and moisture is not deposited on the windshield and windows. If desirable openings 86 may be provided in the rear ledge 87, which openings lead to the trunk compartment 88 and openings 89 can be provided in the trunk compartment. This latter construction provides for a more ready escape of air from the compartment 21 and is particularly useful since it is disposed adjacent the rear window 27, and therefore it permits the free circulation of air over the window 27. In this manner the air within the compartment and at the window 27 is not reduced to the dew point temperature.

The capacity of the duct system is designed and proportioned so as to prevent the flow of excessive air into the compartment 21 when the automobile is moving at a high rate of speed as an excessive amount of air would be objectionable to the occupants in the compartment. Since it is desirable to so limit the capacity of the duct system, insufficient air will flow to the compartment when the automobile is traveling at a relatively slow speed. In order to supply sufficient air to the compartment 21 while the automobile is traveling at a slow speed or when the automobile is stationary, I have provided a fan or blower, for increasing the flow of air or for causing the flow of air when the automobile is stationary. The fan structure must be so designed so that it will not materially affect the flow of air when the fan is not operative. I therefore provide a sirocco type blower 91 and dispose the same in the manifold 41. The manifold includes side walls 92 and 93, the side wall 92 being flared at 94 to provide the inlet 42. An electric motor 95 is carried by the side wall 93 and the shaft 96 thereof extends into the manifold and carries the blower 91. The side of the blower 91, which is adjacent the wall 93, is in the form of a disc 98 from the periphery of which project a plurality of blades 99. The side of the blower 91, opposite the disc 98, is open and the inlet 42 registers with this opening. All of the outlets 44, 45, 46, 47 and 48 of the manifold 41 extend from the periphery of the manifold. The outlets 47 and 48 are provided with generally radially extending vanes 101, but which vanes have the inner ends thereof bent slightly toward the air stream for picking up the air as it is being moved in a circular path by the blower and therefore augment the centrifugal action imparted to the air by the blower. The outlet 46 is provided with a series of vanes 102. These vanes are each pivoted at 103 and are interconnected by a rod 104. A handle 105 is attached to a pivot for one of the vanes for controlling the position of the vanes whereby the relative amount of air discharged therefrom can be controlled.

In warm weather the valve 73 will be closed, but the ducts 37 and 39 and the heater 38 will be warmed by heat developed in the engine 70 and air passing into the compartment 21 through the heating system will be warmer than that desired. A damper 87 is provided in the pipe 58, which damper is operated by a rod 88, one end of which extends through an opening in the instrument panel 29 within reach of the operator of the automobile. Thus the operator may close the air inlet of the heating system when the temperature of the air is objectionable.

From the foregoing, it is apparent that I have provided a heating system which is particularly useful for heating vehicles, for example automobiles, which travel at varying rates of speed. At moderate rates of automobile speed, sufficient air is delivered to the occupant compartment and the duct system is designed so as to restrict the flow of air in the event the automobile is traveling at a high rate of speed. At relatively low rates of speed, or when the automobile is stationary, the blower augments the flow of air or causes the flow of air, respectively. The blower structure is constructed to substantially permit the free flow of air through the duct system when the blower is not operating, and, since the air can flow freely when the blower is not operating, the blower need operate only when the automobile is traveling at a relatively low rate of speed or when it is stationary. If desirable the blower motor can be started or stopped in response to engine speed but in the preferred embodiment the starting and stopping thereof is controlled manually and the manual control may be disposed on the instrument panel as is the usual practice or any other place accessible to the occupant of the automobile.

While the form of embodiment of the present invention as herein disclosed constitutes a preferred form, it is to be understood that other forms might be adopted, all coming within the scope of the claim which follows.

I claim:

In combination, a vehicle including a closed body, an air distributing manifold in said body, said manifold having spaced side walls and a substantially circular peripheral wall connecting the side walls, said peripheral wall having a plurality of air outlet openings spaced from one another about the peripheral wall, one of said side walls having an air intake opening; a fan in said manifold, said fan including a rotatable fan blade carrying member disposed within the manifold, and a plurality of blades forming an annular group, each of said blades having one end thereof carried by said member and each extending along and adjacent the inner periphery of the said peripheral wall, at least the major portion of each of said blades lying closer to the periphery of the manifold than to the axis of the latter, said inlet opening in said side wall being adjacent the axis of the fan; means for rotating the member for causing air to be drawn by said blades through said air inlet opening and discharged through said air outlet openings; means forming a heat exchanger having an air outlet connected with the air inlet of the manifold, said heat exchanger having an air inlet; and means independent of said fan and connected to the air inlet of the heat exchanger for forcing air from outside said body through the heat exchanger, the inlet of the manifold, the manifold and the outlets of the latter by forward movement of the vehicle.

ESTEL C. RANEY.